(12) United States Patent
Kitahara et al.

(10) Patent No.: US 8,997,797 B2
(45) Date of Patent: Apr. 7, 2015

(54) FLUORORESIN AND RISER PIPE

(75) Inventors: Takahiro Kitahara, Settsu (JP);
Takuma Kawabe, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 146 days.

(21) Appl. No.: 13/258,427

(22) PCT Filed: Mar. 16, 2010

(86) PCT No.: PCT/JP2010/054451
§ 371 (c)(1),
(2), (4) Date: Sep. 21, 2011

(87) PCT Pub. No.: WO2010/110129
PCT Pub. Date: Sep. 30, 2010

(65) Prior Publication Data
US 2012/0015124 A1    Jan. 19, 2012

(30) Foreign Application Priority Data

| | | |
|---|---|---|
| Mar. 23, 2009 | (JP) | 2009-070328 |
| Jun. 3, 2009 | (JP) | 2009-134386 |
| Feb. 8, 2010 | (JP) | 2010-025297 |

(51) Int. Cl.
*C08F 214/26* (2006.01)
*C08F 214/18* (2006.01)
*C08F 214/22* (2006.01)
*F16L 11/08* (2006.01)

(52) U.S. Cl.
CPC ............. *C08F 214/18* (2013.01); *C08F 214/22* (2013.01); *C08F 214/225* (2013.01); *C08F 214/26* (2013.01); *C08F 214/265* (2013.01); *F16L 11/081* (2013.01)

(58) Field of Classification Search
CPC .. C08F 214/22; C08F 214/26; C08F 214/265; C08F 214/225; F16L 11/081
USPC ................................. 526/247, 249
See application file for complete search history.

(56) References Cited

U.S. PATENT DOCUMENTS

| | | | |
|---|---|---|---|
| 3,331,811 A | | 7/1967 | Schafer |
| 4,755,081 A | * | 7/1988 | Esparza ..................... 405/168.1 |
| 4,990,406 A | | 2/1991 | Kappler et al. |
| 5,284,893 A | | 2/1994 | Kubo et al. |
| 5,317,061 A | | 5/1994 | Chu et al. |
| 5,856,417 A | * | 1/1999 | Takakura et al. ............. 526/247 |
| 6,096,429 A | * | 8/2000 | Chen et al. .................... 428/421 |
| 7,132,073 B2 | * | 11/2006 | Inaba et al. ............. 264/171.28 |
| 2009/0203864 A1 | | 8/2009 | Amin-Sanayei |
| 2010/0314154 A1 | * | 12/2010 | Kitahara et al. ........ 174/110 SR |
| 2011/0159222 A1 | * | 6/2011 | Chen et al. ................. 428/36.91 |

FOREIGN PATENT DOCUMENTS

| | | |
|---|---|---|
| EP | 1743920 A1 | 1/2007 |
| EP | 1752477 A1 | 2/2007 |
| JP | 51-071287 A | 6/1976 |
| JP | 57-123603 A | 8/1982 |
| JP | 2-123152 A | 5/1990 |
| JP | 3-066714 A | 3/1991 |
| JP | 4-189879 A | 7/1992 |
| JP | 05-043709 A | 2/1993 |
| JP | 5-295038 A | 11/1993 |
| JP | 08-176390 A | 7/1996 |
| JP | 09-176425 A | 7/1997 |
| JP | 11-335422 A | 12/1999 |
| JP | 2002-156533 A | 5/2002 |
| JP | 2004-217728 A | 5/2004 |
| JP | 2004-217728 A | 8/2004 |
| JP | 2004-219579 A | 8/2004 |
| WO | 2005028198 A1 | 3/2005 |
| WO | WO 2007078916 A2 | 7/2007 |
| WO | 2008/005745 A2 | 1/2008 |

* cited by examiner

*Primary Examiner* — Nicole M Buie-Hatcher
(74) *Attorney, Agent, or Firm* — Sughrue Mion, PLLC

(57) ABSTRACT

An object of the present invention it to provide a novel fluororesin that has excellent mechanical strength and chemical resistance, and very low permeability at high temperature. The fluorine resin a copolymer that includes copolymerized units derived from tetrafluoroethylene, vinylidene fluoride, and an ethylenically unsaturated monomer other than tetrafluoroethylene and vinylidene fluoride. The fluororesin has a storage modulus E', as measured at 170° C. by a dynamic viscoelasticity analysis, in the range of 60 to 400 MPa.

9 Claims, 1 Drawing Sheet

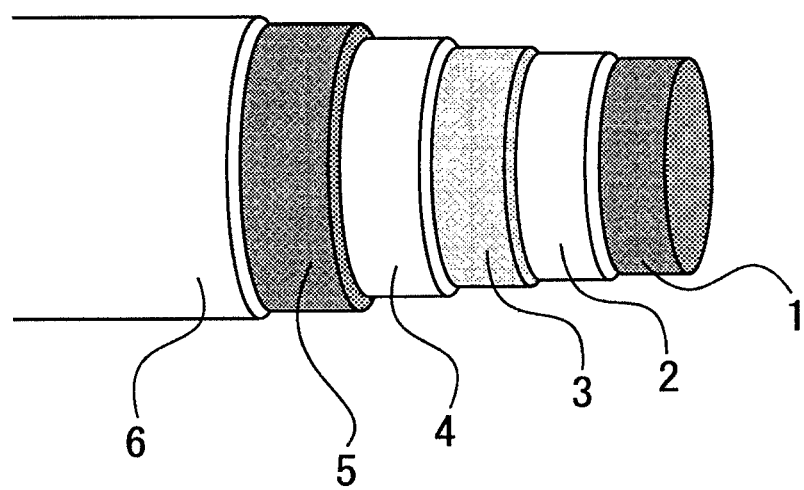

FLUORORESIN AND RISER PIPE

CROSS REFERENCE TO RELATED APPLICATIONS

This application is a National Stage of International Application No. PCT/JP2010/054451 filed Mar. 16, 2010, claiming priority based on Japanese Patent Application Nos. 2009-070328, filed Mar. 23, 2009, 2009-134386 filed Jun. 3, 2009 and 2010-025297 filed Feb. 8, 2010, the contents of all of which are incorporated herein by reference in their entirety.

TECHNICAL FIELD

The present invention relates to a fluororesin and a riser pipe.

BACKGROUND ART

Pipes intended for use in deepwater oil fields include risers (pipes through which crude oil is transported upwards), umbilicals (pipes for controlling oil production, which include an assembled unit consisting of a power cable, a pipe carrying a liquid agent for decreasing the viscosity of crude oil, and the like), and flowlines (pipes for transporting produced crude oil on sea beds). These pipes have various structures. Some of them are pipes made of only metal, and some of them are metal/resin hybrid pipes. Currently, there is a trend away from pipes made of only metal and toward metal/resin hybrid pipes, with the aim of reducing the weight. In order to withstand the temperature of produced crude oil which increases with the depth of offshore drilling, resins used for such pipes are required to have good mechanical strength and chemical resistance at high temperature (tolerance to high temperature crude oil, tolerance to acidic gas (e.g. hydrogen sulfide) in crude oil at high temperature, and tolerance to liquid agents (e.g. methanol, hydrogen chloride) to be injected to decrease the viscosity of crude oil at high temperature), and to have low permeability at high temperature. As a result, there is a need for an alternative material usable instead of polyamide (operating temperature limit: 90° C.) and polyvinylidene fluoride (operating temperature limit: 130° C.), which are currently used for these pipes.

Based on the common knowledge that fluororesins such as polyvinylidene fluoride are excellent in performances including chemical resistance, fluororesins such as those noted below have been developed.

Patent Documents 1 to 5 disclose copolymers containing specific amounts of tetrafluoroethylene, vinylidene fluoride, and chlorotrifluoroethylene.

Patent Document 6 discloses a copolymer containing specific amounts of tetrafluoroethylene, vinylidene fluoride and one of chlorotrifluoroethylene and hexafluoropropylene.

Patent Document 7 discloses a copolymer containing specific amounts of tetrafluoroethylene, vinylidene fluoride, and ethylene trifluoride.

Patent Documents 8 to 10 disclose copolymers containing specific amounts of tetrafluoroethylene, vinylidene fluoride, and perfluorovinyl ether.

Patent Document 1: U.S. Pat. No. 3,331,811
Patent Document 2: JP 51-71287 A
Patent Document 3: JP 2-123152 A
Patent Document 4: JP 4-189879 A
Patent Document 5: WO 2007/078916
Patent Document 6: JP 5-295038 A
Patent Document 7: JP 57-123603 A
Patent Document 8: JP 2004-217728 A
Patent Document 9: JP 3-66714 A
Patent Document 10: JP 2004-219579 A

SUMMARY OF THE INVENTION

Problems to be Solved by the Invention

However, intensive studies by the present inventors have shown that the conventional fluororesins have low elasticity at high temperature and therefore fail to have satisfactory levels of mechanical strength and chemical resistance, and a sufficiently low level of permeability in such a severe condition that the temperature of crude oil is higher than 130° C. This knowledge has created a need for development of a novel fluororesin that exhibits improved levels of these performances.

Therefore, an object of the present invention is to provide a novel fluororesin that has improved mechanical strength and chemical resistance, and very low permeability at high temperature.

Means for Solving the Problems

The present invention provides a fluororesin that includes a copolymer containing copolymerized units derived from tetrafluoroethylene, vinylidene fluoride, and an ethylenically unsaturated monomer other than tetrafluoroethylene and vinylidene fluoride, and has a storage modulus E', as measured at 170° C. by a dynamic viscoelasticity analysis, in the range of 60 to 400 MPa.

The present invention also provides a riser pipe including a pipe produced from the fluororesin.

Effects of the Invention

The fluororesin of the present invention has excellent mechanical strength and chemical resistance, and very low permeability at high temperature.

BRIEF DESCRIPTION OF THE DRAWINGS

FIG. 1 is a schematic view illustrating one example of the structure of a riser pipe.

MODES FOR CARRYING OUT THE INVENTION

The present invention provide a copolymer that contains the following copolymerized units derived from tetrafluoroethylene, vinylidene fluoride and an ethylenically unsaturated monomer other than tetrafluoroethylene and vinylidene fluoride, and this copolymer has a storage modulus (E'), as measured at 170° C. by a dynamic viscoelasticity analysis, in the range of 60 to 400 MPa.

The storage modulus of the fluororesin of the present invention is high even at a temperature as high as 170° C. A fluororesin with too low a storage modulus at high temperature shows a rapid decrease in mechanical strength, and, as a result, is likely to deform at high temperature. A fluororesin with too high a storage modulus at high temperature is too hard. In this case, it is difficult to wind the fluororesin in the process of molding a pipe. A conventional fluororesin, especially when used for a pipe in a riser pipe for transporting petroleum at a high temperature of not lower than 150° C. at high pressure, may cause problems such as cracks and intrusion into a metallic reinforcing material in contact with the resin because the resin tends to become soft and is likely to deform. In contrast, the fluororesin of the present invention can successfully avoid these problems because this resin has a high storage modulus at high temperature and therefore has excellent mechanical strength and chemical resistance, and very low permeability at high temperature.

The storage modulus is a value determined at 170° C. by a dynamic viscoelasticity analysis, and more specifically is a value determined by analyzing a sample with a length of 30 mm, a width of 5 mm, and a thickness of 0.25 mm by a dynamic viscoelasticity analyzer DVA 220 (IT keisoku seigyo K.K.) in a tensile mode using a supporting span of 20 mm at a temperature increase rate of 2° C./rain from 25° C. to 250° C. at 1 Hz. The storage modulus (E') at 170° C. is preferably in the range of 80 to 350 MPa, and more preferably in the range of 100 to 350 MPa.

The test sample can be prepared, for example, by molding the fluororesin into a 0.25 mm thick film at 3 MPa at a molding temperature higher than the melting point of the fluororesin by 50° C. to 100° C., and cutting the film into a size of 30 mm in length×5 mm in width.

The fluororesin of the present invention is a copolymer that contains the copolymerized units derived from tetrafluoroethylene, vinylidene fluoride, and an other ethylenically unsaturated monomer.

The other ethylenically unsaturated monomer is not particularly limited as long as it is a monomer copolymerizable with tetrafluoroethylene and vinylidene fluoride. The monomer is preferably at least one selected from the group consisting of ethylenically unsaturated monomers represented by the following formulae (1) and (2).

$$CX^1X^2=CX^3(CF_2)_nX^4 \quad \text{Formula (1)}$$

In the formula, $X^1$, $X^2$, $X^3$, and $X^4$, which may be the same or different, each represent H, F, or Cl, and n is an integer of 0 to 8. Tetrafluoroethylene and vinylidene fluoride are excluded from compounds of the formula (1).

$$CF_2=CF-ORf^1 \quad \text{Formula (2)}$$

In the formula, $Rf^1$ is a $C_{1-3}$ alkyl group or a $C_{1-3}$ fluoro alkyl group.

Preferred ethylenically unsaturated monomer(s) represented by the formula (1) are at least one selected from the group consisting of $CF_2=CFCl$, $CF_2=CFCF_3$, and those represented by the following formulae (3) and (4):

$$CH_2=CF-(CF_2)_nX^4 \quad (3)$$

wherein $X^4$ and n are as defined above, and $$CH_2=CH-(CF_2)_nX^4 \quad (4)$$

wherein $X^4$ and n are as defined above.

More preferred monomer(s) are at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$, and $CF_2=CFCF_3$, and still more preferred monomer(s) are at least one of $CF_2=CFCl$ and $CH_2=CFCF_3$.

Preferred ethylenically unsaturated monomer(s) represented by the formula (2) are at least one selected from the group consisting of $CF_2=CF-OCF_3$, $CF_2=CF-OCF_2CF_3$, and $CF_2=CF-OCF_2CF_2CF_3$.

Preferably, the fluororesin of the present invention is a copolymer that contains 55.0 to 90.0 mol % of copolymerized units derived from tetrafluoroethylene, 5.0 to 44.9 mol % of copolymerized units derived from vinylidene fluoride, and 0.1 to 10.0 mol % of copolymerized units derived from an ethylenically unsaturated monomer represented by the formula (1):

$$CX^1X^2=CX^3(CF_2)_nX^4 \quad (1)$$

In the formula, $X^1$, $X^2$, $X^3$, and $X^4$, which may be the same or different, each represent H, F, or Cl, and n is an integer of 0 to 8. Tetrafluoroethylene and vinylidene fluoride are excluded from compounds of the formula (1).

More preferably, the copolymer contains 55.0 to 85.0 mol % of copolymerized units derived from tetrafluoroethylene, 10.0 to 44.9 mol % of copolymerized units derived from vinylidene fluoride, and 0.1 to 5.0 mol % of copolymerized units derived from an ethylenically unsaturated monomer represented by the formula (1).

Still more preferably, the copolymer contains 55.0 to 85.0 mol % of copolymerized units derived from tetrafluoroethylene, 13.0 to 44.9 mol % of copolymerized units derived from vinylidene fluoride, and 0.1 to 2.0 mol % of copolymerized units derived from an ethylenically unsaturated monomer represented by the formula (1).

For improved mechanical strength of the fluororesin at high temperature and remarkably low permeability of the fluororesin, the ethylenically unsaturated monomer represented by the formula (1) is preferably at least one monomer selected from the group consisting of $CH_2=CH-C_4F_9$, $CH_2=CH-C_6F_{13}$, and $CH_2=CF-C_3F_6H$. More preferably, the ethylenically unsaturated monomer represented by the formula (1) is at least one monomer selected from the group consisting of $CH_2=CH-C_4F_9$, $CH_2=CH-C_6F_{13}$ and $CH_2=CF-C_3F_6H$, and the fluororesin is a copolymer that contains 55.0 to 80.0 mol % of copolymerized units derived from tetrafluoroethylene, 19.5 to 44.9 mol % of copolymerized units derived from vinylidene fluoride, and 0.1 to 0.6 mol % of copolymerized units derived from the ethylenically unsaturated monomer represented by the formula (1).

The fluororesin of the present invention may be a copolymer that contains 58.0 to 85.0 mol % of copolymerized units derived from tetrafluoroethylene, 10.0 to 41.9 mol % of copolymerized units of vinylidene fluoride, and 0.1 to 5.0 mol % of copolymerized units derived from an ethylenically unsaturated monomer represented by the formula (1).

Alternatively, the fluororesin of the present invention is preferably a copolymer that contains 55.0 to 90.0 mol % of copolymerized units derived from tetrafluoroethylene, 9.2 to 44.2 mol % of copolymerized units derived from vinylidene fluoride, and 0.1 to 0.8 mol % of copolymerized unit derived from an ethylenically unsaturated monomer represented by the formula (2):

$$CF_2=CF-ORf^1 \quad (2).$$

In the formula, $Rf^1$ represents a $C_{1-3}$ alkyl group or a $C_{1-3}$ fluoro alkyl group.

More preferably, the copolymer contains 58.0 to 85.0 mol % of copolymerized units derived from tetrafluoroethylene, 14.5 to 39.9 mol % of copolymerized units derived from vinylidene fluoride, and 0.1 to 0.5 mol % of copolymerized unit derived from an ethylenically unsaturated monomer represented by the formula (2).

Alternatively, the fluororesin of the present invention is preferably a copolymer that contains 55.0 to 90.0 mol % of copolymerized units derived from tetrafluoroethylene, 5.0 to 44.8 mol % of copolymerized units derived from vinylidene fluoride, 0.1 to 10.0 mol % of copolymerized units derived from an ethylenically unsaturated monomer represented by the formula (1), and 0.1 to 0.8 mol % of copolymerized units derived from an ethylenically unsaturated monomer represented by the formula (2).

More preferably, the copolymer contains 55.0 to 85.0 mol % of copolymerized units derived from tetrafluoroethylene, 9.5 to 44.8 mol % of copolymerized units derived from vinylidene fluoride, 0.1 to 5.0 mol % of copolymerized units derived from an ethylenically unsaturated monomer represented by the formula (1), and 0.1 to 0.5 mol % of copolymerized units derived from an ethylenically unsaturated monomer represented by the formula (2).

Still more preferably, the copolymer contains 55.0 to 80.0 mol % of copolymerized units derived from tetrafluoroethylene, 19.8 to 44.8 mol % of copolymerized units derived from vinylidene fluoride, 0.1 to 2.0 mol % of copolymerized units derived from an ethylenically unsaturated monomer represented by the formula (1), and 0.1 to 0.3 mol % of copolymerized units derived from an ethylenically unsaturated monomer represented by the formula (2). With this composition, the fluororesin of the present invention has remarkably low permeability.

The fluororesin of the present invention may be a copolymer that contains 58.0 to 85.0 mol % of copolymerized units derived from tetrafluoroethylene, 9.5 to 39.8 mol % of copolymerized units derived from vinylidene fluoride, 0.1 to 5.0 mol % of copolymerized units derived from an ethylenically unsaturated monomer represented by the formula (1), and 0.1 to 0.5 mol % of copolymerized units derived from an ethylenically unsaturated monomer represented by the formula (2).

The fluororesin of the present invention, because containing the above monomer units within the above ranges, has higher crystallinity and a high storage modulus at 170° C. than conventional copolymers containing tetrafluoroethylene, vinylidene fluoride and a third component. Therefore, the fluororesin of the present invention has excellent mechanical strength and chemical resistance, and very low permeability at high temperature. The phrase "low permeability at high temperature" means low permeability to substances such as methane, hydrogen sulfide, $CO_2$, methanol and hydrochloric acid.

The amounts of the monomer units in the copolymer can be calculated by performing NMR, and optionally an element analysis is also performed for some monomer units.

Preferably, the fluororesin of the present invention has a melt flow rate (MFR) of 0.1 to 50 g/10 min.

The MFR is defined as the mass (g/10 minutes) of a polymer flowing out from a nozzle (inner diameter: 2 mm, length: 8 mm) for 10 minutes at 297° C. under a load of 5 kg and is measured using Melt Indexer (Toyo Seiki Seisaku-sho, Ltd.) in accordance with ASTM D3307-01.

Preferably, the fluororesin of the present invention has a melting point of not lower than 180° C. The upper limit thereof may be 290° C. The more preferable lower limit is 200° C. and the more preferable upper limit is 270° C.

The melting point is defined as the peak temperature of an endothermic curve that is obtained by a thermal measurement at a temperature increase rate of 10° C./minute using a differential scanning calorimeter RDC 220 (Seiko Instruments Inc.) in accordance with ASTM D-4591.

Preferably, the fluororesin of the present invention has a thermal decomposition onset temperature (1% mass loss temperature) of not lower than 360° C. The more preferable lower limit is 370° C. The upper limit may be, for example, 410° C. as long as the thermal decomposition onset temperature falls within the above range.

The thermal decomposition onset temperature is defined as the temperature at which a fluororesin under a heating test loses 1% of the mass by decomposition, and can be determined by measuring the temperature at which the mass of the fluororesin under a heating test loses 1% of the mass, using a thermogravimetric/differential thermal analyzer (TG-DTA).

The fluororesin of the present invention can be produced by a polymerization technique such as solution polymerization, mass polymerization, emulsion polymerization or suspension polymerization. For easy industrial-scale production, emulsion polymerization or suspension polymerization is preferred.

In the polymerization process, polymerization initiator(s), surfactant(s), chain transfer agent(s), and a solvent can be used. As these agents, conventionally known agents may be used.

Specifically, examples of the polymerization initiator(s) include oil-soluble radical polymerization initiators and water-soluble radical initiators.

The oil-soluble radical polymerization initiators may be known oil-soluble peroxides and representative examples thereof include dialkylperoxy carbonates such as diisopropyl peroxydicarbonate, di-n-propyl peroxydicarbonate and di-sec-butyl peroxydicarbonate; peroxy esters such as t-butylperoxy isobuthylate and t-butylperoxy pivalate; dialkyl peroxides such as di-t-butyl peroxide; and di [perfluoro (or fluorochloro)acyl]peroxides such as
di(ω-hydro-dodecafluoroheptanoyl)peroxide,
di(ω-hydro-tetradecafluoroheptanoyl)peroxide,
di(ω-hydro-hexadecafluorononanoyl)peroxide,
di(perfluorobutyryl)peroxide, di(perfluorovaleryl)peroxide,
di(perfluorohexanoyl)peroxide,
di(perfluoroheptanoyl)peroxide,
di(perfluorooctanoyl)peroxide,
di(perfluorononanoyl)peroxide,
di(ω-chloro-hexafluorobutyryl)peroxide,
di(ω-chloro-decafluorohexanoyl)peroxide,
di(ω-chloro-tetradecafluorooctanoyl)peroxide,
ω-hydro-dodecafluoroheptanoyl-ω-hydrohexadecafluorononanoyl peroxide,
ω-chloro-hexafluorobutyryl-ω-chloro-decafluorohexanoyl-peroxide,
ω-hydrododecafluoroheptanoyl-perfluorobutyryl-peroxide,
di(dichloropentafluorobutanoyl)peroxide,
di(trichlorooctafluorohexanoyl)peroxide,
di(tetrachloroundecafluorooctanoyl)peroxide,
di(pentachlorotetradecafluorodecanoyl)peroxide and
di(undecachlorodotriacontafluorodocosanoyl)peroxide.

The water-soluble radical polymerization initiators may be known water-soluble peroxides and specific examples thereof include ammonium, potassium and sodium salts of persulfuric acid, perboric acid, perchloric acid, superphosphoric acid, and percarbonic acid; t-butyl permaleate; and t-butyl hydroperoxide. These peroxides may be used in combination with reducing agent(s) such as sulfites and sulfites. In this case, the amount of the reducing agent(s) is 0.1 to 20 times greater than the amount of peroxide(s) used.

As the surfactant(s), known surfactant(s) may be used. Specific examples thereof include nonionic surfactants, anionic surfactants, and cationic surfactants. Among these, preferred are fluorine-containing anionic surfactants. More preferred are linear or branched $C_{4-20}$ fluorine-containing anionic surfactants which may or may not contain an etheric oxygen (an oxygen between carbon atoms). The amount of such surfactant(s) (based on water as a polymerization medium) is preferably 50 to 5000 ppm.

Specific examples of the chain transfer agent(s) include hydrocarbons such as ethane, isopentane, n-hexane and cyclohexane; aromatic compounds such as toluene and xylene; ketones such as acetone; acetic acid esters such as ethyl acetate and butyl acetate; alcohols such as methanol and ethanol; mercaptans such as methyl mercaptan; and halogenated hydrocarbons such as carbon tetrachloride, chloroform, methylene chloride and methyl chloride. The amount of such chain transfer agent(s) depends on their chain transfer constants and is typically 0.01 to 20% by mass of the polymerization solvent.

Examples of the solvent include water and a mixed solvent of water and an alcohol.

In the case of suspension polymerization, a fluorine-containing solvent may be used in combination with water. Examples of the fluorine-containing solvent include hydrochlorofluoro alkanes such as $CH_3CClF_2$, $CH_3CCl_2F$, $CF_3CF_2CCl_2H$ and $CF_2ClCF_2CFHCl$; chlorofluoro alkanes such as $CF_2ClCFClCF_2CF_3$ and $CF_3CFClCFClCF_3$; and perfluoro alkanes such as perfluorocyclobutane, $CF_3CF_2CF_2CF_3$, $CF_3CF_2CF_2CF_2CF_3$ and $CF_3CF_2CF_2CF_2CF_2CF_3$. Among these, preferred are perfluoro alkanes. For easy suspension and cost savings, the amount of such a fluorine solvent is preferably 10 to 100% by mass based on the amount of an aqueous medium.

The polymerization temperature is not particularly limited, and may be 0° C. to 100° C. The polymerization pressure can be appropriately determined by considering the type and amount of a solvent used, vapor pressure, polymerization temperature and other polymerization conditions, and is typically 0 to 9.8 MPaG.

The fluororesin of the present invention may be in any form and may be in the form of an aqueous dispersion, powder, pellets or the like.

The fluororesin of the present invention can be molded into various forms, and resulting moldings have good properties such as excellent mechanical strength and chemical resistance at high temperature, and very low permeability at high temperature.

The shapes of the moldings are not particularly limited, and these moldings may be, for example, hoses, pipes, tubes, sheets, seals, gaskets, packing members, films, tanks, rollers, bottles, containers and the like. A pipe produced from the fluororesin of the present invention is also one aspect of the present invention.

The fluororesin may be molded by any molding method, and examples thereof include compression molding, extrusion molding, transfer molding, injection molding, rotomolding, rotolinning molding and electrostatic coating. In the case that the fluororesin of the present invention is molded into a pipe, extrusion molding is preferred.

The fluororesin of the present invention may be mixed with additives such as a filler, plasticizer, processing aid, releasing agent, pigment, fire retardant, lubricant, light stabilizer, weathering stabilizer, conductive agent, antistatic agent, ultraviolet absorbent, antioxidant, foaming agent, perfume, oil, softener and dehydrofluorination agent, and then the mixture may be molded. Examples of the filler include polytetrafluoroethylene, mica, silica, talc, celite, clay, titanium oxide and barium sulfate. Examples of the conductive agent include carbon black. Examples of the plasticizer include dioctyl phthalate and pentaerythritol. Examples of the processing aid include carnauba wax, sulfone compounds, low-molecular-weight polyethylenes and fluorine-containing auxiliary agents. Examples of the dehydrofluorination agent include organic oniums and amidins.

Use of the fluororesin at a temperature of 160° C. or higher is also one aspect of the present invention. The fluororesin of the present invention has satisfactory levels of mechanical strength and chemical resistance, and a sufficiently low level of permeability even at a temperature of 160° C. or higher.

A riser pipe including a pipe produced from the fluororesin of the present invention is also one aspect of the present invention. A pipe produced from the fluororesin of the present invention can be suitably used for, for example, the flexible metal pipe disclosed in JP 7-276523 A, the pipe for transporting a high-temperature fluid disclosed in JP 61-6485 A, or the multi-layer flexible pipe disclosed in U.S. Pat. No. 2008/0314471.

The riser pipe can be suitably used as a riser pipe for transporting a material in a deepwater oil field or a deepwater gas field from the sea bed to above the sea surface. Examples of the material include fluids such as crude oil, petroleum gas and natural gas.

FIG. 1 is an exemplary view of one embodiment of the riser pipe of the present invention. It should be noted that the rider pipe of the present invention is not limited only to this example.

A pipe 2 is produced from the fluororesin of the present invention and serves to prevent a material flowing inside the riser pipe from leaking out. When a high-temperature, high-pressure fluid is flowing through the riser pipe, some problems may arise such as intrusion of a part of the pipe 2 into a reinforcement layer 3, deformation, and cracks. The fluororesin of the present invention, however, can overcome these problems.

The pipe 2 includes a body (carcass) 1 in the inside. This structure enables the riser pipe to withstand high pressure and to maintain its shape even when the riser pipe is used in deep water. The pipe 2 is surrounded with metallic reinforcement layers 3 and 5, and an anti-friction layer 4 for preventing friction is provided between the reinforcement layers 3 and 5. The reinforcement layers 3 and 5 serve to prevent the riser pipe from bursting due to the pressure of a material flowing inside. These reinforcement layers may be made of metal, and may have different structures from each other to provide resistance against stress in different directions. In order to prevent damage to the pipe 2 caused by a contact between the pipe 2 and the metallic reinforcement layer, a thermoplastic resin layer may be provided between the pipe 2 and the body 1 or the reinforcement layer 3. An outer resin 6 surrounds the outer periphery of the reinforcement layer 5 and separates the riser pipe from the outside. The outer resin 6 is formed from polyethylene, polyamide or the like.

The fluororesin of the present invention can be also used for applications other than riser pipes and, for example, can be suitably used as a coating material or lining material to be applied on the innermost or outermost surface of a metallic pipe that is designed for use in or on the ground or sea bed for transportation of a fluid such as crude oil or natural gas. If used for coating or lining the innermost surface of a metallic pipe, the fluororesin shields carbon dioxide and hydrogen sulfide in crude oil and natural gas, which cause corrosion of the metallic pipe, so as to prevent corrosion of the metallic pipe, and also reduces fluid friction of hyperviscous crude oil. If used for the outermost surface of a pipe, the fluororesin prevents corrosion caused by sea water, acid water or the like. In the case where the fluororesin is used for lining or coating the innermost or outermost surface of a pipe, the fluororesin may be filled with glass fiber, carbon fiber, aramid resin, mica, silica, talc, celite, clay, titanium oxide or the like in order to further improve the rigidity and strength of the fluororesin of the present invention. In order to ensure adhesion of the fluororesin to the meal, an adhesive may be used, or alternatively the metal surface may be roughened.

In addition, the fluororesin can be suitably used as a molding material for the following moldings.

Examples of the moldings include: food packaging films, lining materials, packing members, sealing materials and sheets for use in fluid transfer lines in food manufacturing/processing steps and other fluid transfer members for food manufacturing/processing apparatuses;

bottle stoppers and packaging films for chemicals and drugs, lining materials, packing members, sealing materials, sheets and other liquid drug transfer members for use in fluid transfer lines in chemicals or drugs manufacturing steps;

lining material for the inner surfaces of liquid chemical tanks and pipes in chemical plants and semiconductor fabrication plants;

O (square) rings, tubes, packing members, valve cores, hoses, sealing materials and the like for use in automotive fuel systems and peripheral equipment, and hoses, sealing materials and other fuel transfer members for use in automotive AT gears;

carburetor flange gaskets, shaft seals, valve stem seals, sealing materials, hoses and the like for use in automotive engines and peripheral equipment, automotive brake hoses, air conditioner hoses, radiator hoses, electric wire coverings, and other automotive parts;

O (square) rings, tubes, packing members, valve cores, hoses, sealing materials, rolls, gaskets, diaphragms, joints and other members for transferring liquid chemicals for semiconductor manufacturing, which are to be used in semiconductor manufacturing equipment;

painting rolls, hoses, tubes, ink containers and other painting/inking members for paints and inks to be used in painting/coating equipment;

food and drink tubes or food and drink hoses and like tubes, hoses, belts, packing members, joints and other food and drink transfer members, food packaging materials, and glass cookware;

tubes, hoses and other waste liquid transfer members for waste liquid transfer;

tubes, hoses and other high-temperature liquid transfer members for high-temperature liquid transfer;

tubes, hoses and other steam piping system members for steam piping;

tapes to be wound around pipes on ship decks and other corrosion preventing tapes for piping systems;

electric wire coverings, optical fiber coverings, transparent surface coverings to be provided on photovoltaic devices on the incidence plane side thereof in solar cells, back surface members and other various coverings;

diaphragms of diaphragm pumps, various packing members and other sliding members;

films for agricultural use, weathering resistant coverings for various roofing materials, side walls and so forth;

interior finishing materials for use in the field of building/construction, coating or covering materials for glass species such as nonflammable fireproof safety glass; and lining materials for laminated steel sheets used in household electric appliances.

More specific examples of the fuel transfer members for use in automotive fuel systems further include fuel hoses, filler hoses and evaporator hoses. Such fuel transfer members can also be used as fuel transfer members for and resistant to sour gasoline, alcoholic fuels, and fuels containing such gasoline additive(s) as methyl tert-butyl ether and/or an amine.

The above-mentioned stoppers and packaging films for chemicals and drugs have good chemical resistance, for example acid resistance. As the above-mentioned liquid drug transfer members, there may be mentioned, by way of example, anticorrosive tapes to be wound around pipes in chemical plants.

Other examples of the moldings include automotive radiator tanks, tanks for liquid chemicals, bellows, spacers, rollers, gasoline tanks, containers for transferring waste liquids, containers for transferring high-temperature liquids, and tanks for use in fishery and pisciculture.

Still other examples of the moldings include automotive bumpers or fenders, door trims, instrument panels, food processing apparatuses, cooking utensils, water-repelling oily glass species, illumination-related devices and apparatuses, display panels and housings for OA apparatuses, decorative illumination type sign boards, displays, liquid crystal displays, cellular phones, printed circuit boards, electric/electronic parts, miscellaneous goods, trash cans, bathtubs, unit baths, ventilation fans, and lighting apparatus frames.

EXAMPLES

The present invention will be described by means of the following Examples in more detail. The characteristics and physical properties were determined as follows.

Monomer Composition of Fluororesin

The amounts of monomer units were determined from integration values of peaks obtained by $^{19}$F-NMR analysis at a temperature of (melting point of a polymer+20)° C. using a nuclear magnetic resonance apparatus AC 300 (Bruker-Biospin Co., Ltd.), and optionally an element analysis was also performed for some monomer units.

Melting Point

The melting point was determined from a peak of an endothermic curve obtained by a thermal measurement at a temperature increase rate of 10° C./minute using a differential scanning calorimeter RDC220 (Seiko Instruments Inc.) in accordance with ASTM D-4591.

Melt Flow Rate [MFR]

The MFR is defined as the mass (g/10 minutes) of a polymer flowing out from a nozzle (inner diameter: 2 mm, length: 8 mm) for 10 minutes at 297° C. under a load of 5 kg, and was measured using Melt Indexer (Toyo Seiki Seisaku-sho, Ltd.) in accordance with ASTM D3307-01.

Storage Modulus (E')

The storage modulus is a value determined at 170° C. by a dynamic viscoelasticity analysis, and specifically was determined by analyzing a sample with a length of 30 mm, a width of 5 mm, and a thickness of 0.25 mm by a dynamic viscoelasticity analyzer DVA 220 (IT keisoku seigyo K.K.) in a tensile mode using a supporting span of 20 mm at a temperature increase rate of 2° C./min from 25° C. to 250° C. at 1 Hz.

Samples for this analysis were prepared as follows. A single acting compression molding machine (NF-37, piston diameter: (φ 150 mm) available from Shinto Metal Industries, Corp. was used. The molding temperature was appropriately controlled to be higher than the melting point of a fluororesin by 50° C. to 100° C. The polymer was fed to a metal die (φ 100 mm) of SCM435 with a nickel treated surface in such a manner that the final thickness of a sample to be formed would become 0.25 mm. The polymer was preheated at the set temperature for 20 minutes without increasing the pressure. Subsequently, the pressure was increased and decreased in the range of 1 to 2 MPa. This procedure was repeated several times, and then the air was vented. Thereafter, the pressure was increased to 3 MPa and maintained for 1 minute. The pressure was then decreased and the die was transferred to a cooling plate. Subsequently, the pressure was increased to 3 MPa again, while the die was cooled with water for 5 minutes. After decreasing the pressure, the die was taken out and a pressed film thus obtained was cut into a sample with a length of 30 mm and a width of 5 mm. The molding temperatures in Examples and Comparative Examples are shown in Table 1.

Thermal Decomposition Onset Temperature (1% by Mass Loss Temperature)

The thermal decomposition onset temperature is defined as the temperature at which a fluororesin under a heating test loses 1% of the mass, and was measured using a thermogravimetric/differential thermal analyzer (TG-DTA).

Example 1

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, chlorotrifluoroethylene [CTFE] (0.17 kg), tetrafluoroethylene [TFE] (5.96 kg), and vinylidene fluoride [VDF] (0.96 kg) were sequentially added, and a methanol solution (130 g) containing 50% by mass of di-n-propyl peroxydicarbonate [NPP] (polymerization initiator) was added to initiate polymerization. Ethyl acetate (0.435 kg) was also added to the mixture at the initiation of polymerization. Since the pressure in the system decreased with the progress of polymerization, a TFE/VDF/CTFE gaseous monomer mixture (TFE/VDF/CTFE: 65.0/33.0/2.0 (mol %)) was added to maintain the pressure in the system at 0.9 MPa. Finally, the polymerization was terminated when the amount of the added gaseous monomer mixture reached 8 kg. The pressure was reduced to atmospheric pressure, and the resulting TFE/VDF/CTFE copolymer was rinsed with water and dried. In this way, 7.5 kg of powder was obtained.

Next, the powder was melt-kneaded into pellets using a single-screw extruder (screw diameter: 20 mm) at a cylinder temperature of 280° C. The obtained pellets were heated to 150° C. for 12 hours.

The composition and physical properties of the obtained pellets were as follows:
TFE/VDF/CTFE: 65.0/33.3/1.7 (mol %)
Melting point: 231° C.
MFR: 1.2 g/10 min (297° C., 5 kg)
Storage modulus (E') at 170° C.: 268 MPa
Thermal decomposition onset temperature (1% by mass loss temperature): 386° C.

Example 2

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, chlorotrifluoroethylene [CTFE] (0.17 kg), tetrafluoroethylene [TFE] (6.22 kg), and vinylidene fluoride [VDF] (0.68 kg) were sequentially added, and a methanol solution (130 g) containing 50% by mass of di-n-propyl peroxydicarbonate [NPP] (polymerization initiator) was added to initiate polymerization. Ethyl acetate (0.6 kg) was also added to the mixture at the initiation of polymerization. Since the pressure in the system decreased with the progress of polymerization, a TFE/VDF/CTFE gaseous monomer mixture (TFE/VDF/CTFE: 71.2/27.3/1.5 (mol %)) was added to maintain the pressure in the system at 0.9 MPa. Finally, the polymerization was terminated when the amount of the added gaseous monomer mixture reached 8 kg. The pressure was reduced to atmospheric pressure, and the resulting TFE/VDF/CTFE copolymer was rinsed with water and dried. In this way, 7.5 kg of powder was obtained.

Next, the powder was melt-kneaded into pellets using a single-screw extruder (screw diameter: 20 mm) at a cylinder temperature of 290° C. The obtained pellets were heated to 150° C. for 12 hours.

The composition and physical properties of the obtained pellets were as follows.
TFE/VDF/CTFE: 72.1/26.3/1.6 (mol %)
Melting point: 242° C.
MFR: 0.9 g/10 min (297° C., 5 kg)
Storage modulus (E') at 170° C.: 132 MPa
Thermal decomposition onset temperature (1% by mass loss temperature): 392° C.

Example 3

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, chlorotrifluoroethylene [CTFE] (0.34 kg), tetrafluoroethylene [TFE] (5.96 kg), and vinylidene fluoride [VDF] (0.96 kg) were sequentially added, and a methanol solution (130 g) containing 50% by mass of di-n-propyl peroxydicarbonate [NPP] (polymerization initiator) was added to initiate polymerization. Ethyl acetate (0.25 kg) was also added to the mixture at the initiation of polymerization. Since the pressure in the system decreased with the progress of polymerization, a TFE/VDF/CTFE gaseous monomer mixture (TFE/VDF/CTFE: 64.7/32.9/2.4 (mol %)) was added to maintain the pressure in the system at 0.9 MPa. Finally, the polymerization was terminated when the amount of the added gaseous monomer mixture reached 8 kg. The pressure was reduced to atmospheric pressure, and the resulting TFE/VDF/CTFE copolymer was rinsed with water and dried. In this way, 7.5 kg of powder was obtained.

Next, the powder was melt-kneaded into pellets using a single-screw extruder (screw diameter: 20 mm) at a cylinder temperature of 280° C. The obtained pellets were heated to 150° C. for 12 hours.

The composition and physical properties of the obtained pellets were as follows.
TFE/VDF/CTFE: 64.9/32.7/2.4 (mol %)
Melting point: 226° C.
MFR: 1.8 g/10 min (297° C., 5 kg)
Storage modulus (E') at 170° C.: 192 MPa
Thermal decomposition onset temperature (1% by mass loss temperature): 391° C.

Example 4

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, perfluoro(propyl)vinyl ether (0.34 kg), TFE (6.00 kg), and VDF (1.08 kg) were sequentially added, and a methanol solution (130 g) containing 50% by mass of di-n-propyl peroxydicarbonate [NPP] (polymerization initiator) was added to initiate polymerization. Ethyl acetate (0.30 kg) was also added to the mixture at the initiation of polymerization. Since the pressure in the system decreased with the progress of polymerization, a TFE/VDF gaseous monomer mixture (TFE/VDF: 65.5/34.5 (mol %)) and perfluoro(propyl)vinyl ether were simultaneously added to maintain the pressure in the system at 0.9 MPa. The amount of perfluoro(propyl)vinyl ether added was 0.9 parts based on 100 parts of the gas mixture added. Finally, the polymerization was terminated when the amount of the added gaseous monomer mixture reached 8 kg. The pressure was reduced to atmospheric pressure, and the resulting TFE/VDF/perfluoro(propyl)vinyl ether copolymer was rinsed with water and dried. In this way, 7.5 kg of powder was obtained.

Next, the powder was melt-kneaded into pellets using a single-screw extruder (screw diameter: 20 mm) at a cylinder temperature of 280° C. The obtained pellets were heated to 150° C. for 12 hours.

The composition and physical properties of the obtained pellets were as follows.

TFE/VDF/perfluoro(propyl)vinyl ether: 65.5/34.3/0.2 (mol %)

Melting point: 228° C.
MFR: 1.6 g/10 min (297° C., 5 kg)
Storage modulus (E') at 170° C.: 87 MPa
Thermal decomposition onset temperature (1% by mass loss temperature): 383° C.

Example 5

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, $CH_2=CHCF_2CF_2CF_2CF_2CF_2CF_3$ (0.05 kg), TFE (5.70 kg), and VDF (1.09 kg) were sequentially added, and a methanol solution (130 g) containing 50% by mass of di-n-propyl peroxydicarbonate [NPP] (polymerization initiator) was added to initiate polymerization. Since the pressure in the system decreased with the progress of polymerization, a TFE/VDF gaseous monomer mixture (TFE/VDF: 65.5/34.5 (mol %)) and $CH_2=CHCF_2CF_2CF_2CF_2CF_2CF_3$ were simultaneously added to maintain the pressure in the system at 0.9 MPa. The amount of $CH_2=CHCF_2CF_2CF_2CF_2CF_2CF_3$ added was 3.5 parts based on 100 parts of the gas mixture added. Finally, the polymerization was terminated when the amount of the added gaseous monomer mixture reached 8 kg. The pressure was reduced to atmospheric pressure, and the resulting TFE/VDF/$CH_2=CHCF_2CF_2CF_2CF_2CF_2CF_3$ copolymer was rinsed with water and dried. In this way, 7.5 kg of powder was obtained.

Next, the powder was melt-kneaded into pellets using a single-screw extruder (screw diameter: 20 mm) at a cylinder temperature of 280° C. The obtained pellets were heated to 150° C. for 12 hours.

The composition and physical properties of the obtained pellets were as follows.

TFE/VDF/$CH_2=CHCF_2CF_2CF_2CF_2CF_2CF_3$: 63.4/35.7/0.9 (mol %)

Melting point: 216° C.
MFR: 2.7 g/10 min (297° C., 5 kg)
Storage modulus (E') at 170° C.: 87 MPa
Thermal decomposition onset temperature (1% by mass loss temperature): 373° C.

Example 6

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, 2,3,3,3-tetrafluoropropene (0.036 kg), TFE (5.90 kg), and VDF (1.09 kg) were sequentially added, and a methanol solution (130 g) containing 50% by mass of di-n-propyl peroxydicarbonate [NPP] (polymerization initiator) was added to initiate polymerization. Ethyl acetate (0.30 kg) was also added to the mixture at the initiation of polymerization. Since the pressure in the system decreased with the progress of polymerization, a TFE/VDF/2,3,3,3-tetrafluoropropene gaseous monomer mixture (TFE/VDF/2,3,3,3-tetrafluoropropene: 65.0/34.0/1.0 (mol %)) was added to maintain the pressure in the system at 0.9 MPa. Finally, the polymerization was terminated when the amount of the added gaseous monomer mixture reached 8 kg. The pressure was reduced to atmospheric pressure, and the resulting TFE/VDF/2,3,3,3-tetrafluoropropene copolymer was rinsed with water and dried. In this way, 7.5 kg of powder was obtained.

Next, the powder was melt-kneaded into pellets using a single screw extruder (screw diameter: 20 mm) at a cylinder temperature of 280° C. The obtained pellets were heated to 150° C. for 12 hours.

The composition and physical properties of the obtained pellets were as follows.

TFE/VDF/2,3,3,3-tetrafluoropropene: 65.2/33.8/1.0 (mol %)

Melting point: 227° C.
MFR: 2.1 g/10 min (297° C., 5 kg)
Storage modulus (E') at 170° C.: 186 MPa

Example 7

Distilled water (51.0 L) was charged in a 174-L autoclave, and the autoclave was sufficiently purged with nitrogen. Then, perfluorocyclobutane (55.0 kg) was fed into the autoclave, and the temperature in the system and agitation speed were maintained at 35° C. and 200 rpm, respectively. Next, $CH_2=CHCF_2CF_2CF_2CF_2CF_2CF_3$ (13 g), TFE (4.97 kg), and VDF (1.37 kg) were sequentially added, and a methanol solution (140 g) containing 50% by mass of di-n-propyl peroxydicarbonate [NPP] (polymerization initiator) was added to initiate polymerization. Ethyl acetate (156 g) was also added to the mixture at the initiation of polymerization. Since the pressure in the system decreased with the progress of polymerization, a TFE/VDF gaseous monomer mixture (TFE/VDF: 60.2/39.8 (mol %)) and $CH_2=CHCF_2CF_2CF_2CF_2CF_2CF_3$ were simultaneously added to maintain the pressure in the system at 0.8 MPa. The amount of $CH_2=CHCF_2CF_2CF_2CF_2CF_2CF_3$ added was 1.21 parts based on 100 parts of the gas mixture added. Finally, the polymerization was terminated when the amount of the added gaseous monomer mixture reached 11 kg. The pressure was reduced to atmospheric pressure, and the resulting TFE/VDF/$CH_2=CHCF_2CF_2CF_2CF_2CF_2CF_3$ copolymer was rinsed with water and dried. In this way, 10.4 kg of powder was obtained.

Next, the powder was melt-kneaded into pellets using a single-screw extruder (screw diameter: 20 mm) at a cylinder temperature of 290° C. The obtained pellets were heated to 150° C. for 12 hours.

The composition and physical properties of the obtained pellets were as follows.

TFE/VDF/CH$_2$=CHCF$_2$CF$_2$CF$_2$CF$_2$CF$_2$CF$_3$:60.1/39.6/0.3 (mol %)
Melting point: 218° C.
MFR: 1.7 g/10 min (297° C., 5 kg)
Storage modulus (E') at 170° C.: 153 MPa
Thermal decomposition onset temperature (1% by mass loss temperature): 372° C.

Example 8

Distilled water (900 L) was charged in a 3000-L autoclave, and the autoclave was sufficiently purged with nitrogen. Then, perfluorocyclobutane (674 kg) was fed into the autoclave, and the temperature in the system and agitation speed were maintained at 35° C. and 200 rpm, respectively. Next, CH$_2$=CHCF$_2$CF$_2$CF$_2$CF$_2$CF$_2$CF$_3$ (207 g), TFE (62.0 kg), and VDF (18.1 kg) were sequentially added, and a methanol solution (2.24 kg) containing 50% by mass of di-n-propyl peroxydicarbonate [NPP] (polymerization initiator) was added to initiate polymerization. Ethyl acetate (2.24 kg) was also added to the mixture at the initiation of polymerization. Since the pressure in the system decreased with the progress of polymerization, a TFE/VDF gaseous monomer mixture (TFE/VDF: 60.2/39.8 (mol %)) and CH$_2$=CHCF$_2$CF$_2$CF$_2$CF$_2$CF$_2$CF$_3$ were simultaneously added to maintain the pressure in the system at 0.8 MPa. The amount of CH$_2$=CHCF$_2$CF$_2$CF$_2$CF$_2$CF$_2$CF$_3$ added was 1.21 parts based on 100 parts of the gas mixture added. Finally, the polymerization was terminated when the amount of the added gaseous monomer mixture reached 110 kg. The pressure was reduced to atmospheric pressure, and the resulting TFE/VDF/CH$_2$=CHCF$_2$CF$_2$CF$_2$CF$_2$CF$_2$CF$_3$ copolymer was rinsed with water and dried. In this way, 102 kg of powder was obtained.

Next, the powder was melt-kneaded into pellets using a single-screw extruder (screw diameter: 50 mm) at a cylinder temperature of 290° C. The obtained pellets were heated to 150° C. for 12 hours.

The composition and physical properties of the obtained pellets were as follows.
TFE/VDF/CH$_2$=CHCF$_2$CF$_2$CF$_2$CF$_2$CF$_2$CF$_3$: 59.9/39.8/0.3 (mol %)
Melting point: 218° C.
MFR: 1.3 g/10 min (297° C., 5 kg)
Storage modulus (E') at 170° C.: 155 MPa
Thermal decomposition onset temperature (1% by mass loss temperature): 373° C.

Example 9

Distilled water (51.0 L) was charged in a 174-L autoclave, and the autoclave was sufficiently purged with nitrogen. Then, perfluorocyclobutane (55.0 kg) was fed into the autoclave, and the temperature in the system and agitation speed were maintained at 35° C. and 200 rpm, respectively. Next, CH$_2$=CHCF$_2$CF$_2$CF$_2$CF$_2$CF$_2$CF$_3$ (9 g), perfluoro(propyl)vinyl ether (60 g), TFE (4.99 kg), and VDF (1.37 kg) were sequentially added, and a methanol solution (140 g) containing 50% by mass of di-n-propyl peroxydicarbonate [NPP] (polymerization initiator) was added to initiate polymerization. Ethyl acetate (140 g) was also added to the mixture at the initiation of polymerization. Since the pressure in the system decreased with the progress of polymerization, a TFE/VDF gaseous monomer mixture (TFE/VDF: 60.0/40.0 (mol %)), CH$_2$=CHCF$_2$CF$_2$CF$_2$CF$_2$CF$_2$CF$_3$ and perfluoro(propyl)vinyl ether were simultaneously added to maintain the pressure in the system at 0.8 MPa. The amounts of CH$_2$=CHCF$_2$CF$_2$CF$_2$CF$_2$CF$_2$CF$_3$ and perfluoro(propyl)vinyl ether added were 0.8 parts and 0.3 parts, respectively, based on 100 parts of the gas mixture added. Finally, the polymerization was terminated when the added amount of the gaseous monomer mixture reached 9 kg. The pressure was reduced to atmospheric pressure, and the resulting TFE/VDF/CH$_2$=CHCF$_2$CF$_2$CF$_2$CF$_2$CF$_2$CF$_3$/perfluoro(propyl)vinyl ether copolymer was rinsed with water and dried. In this way, 8.6 kg of powder was obtained.

Next, the powder was melt-kneaded into pellets using a single-screw extruder (screw diameter: 20 mm) at a cylinder temperature of 290° C. The obtained pellets were heated to 150° C. for 12 hours.

The composition and physical properties of the obtained pellets were as follows.
TFE/VDF/CH$_2$=CHCF$_2$CF$_2$CF$_2$CF$_2$CF$_2$CF$_3$/perfluoro(propyl)vinyl ether: 59.8/39.9/0.2/0.1 (mol %)
Melting point: 221° C.
MFR: 1.8 g/10 min (297° C., 5 kg)
Storage modulus (E') at 170° C.: 123 MPa
Thermal decomposition onset temperature (1% by mass loss temperature): 377° C.

Comparative Example 1

Distilled water (52.2 L) was charged in a 174-L autoclave, and the autoclave was sufficiently purged with nitrogen. Then, perfluorocyclobutane (39.1 kg) was fed into the autoclave, and the temperature in the system and agitation speed were maintained at 35° C. and 200 rpm, respectively. Next, TFE (3.6 kg) and VDF (1.05 kg) were sequentially added, and a methanol solution (130 g) containing 50% by mass of di-n-propyl peroxydicarbonate [NPP] (polymerization initiator) was added to initiate polymerization. Ethyl acetate (160 g) was also added to the mixture at the initiation of polymerization. Since the pressure in the system decreased with the progress of polymerization, a TFE/VDF gaseous monomer mixture (TFE/VDF: 60.2/39.8 (mol %)) was added to maintain the pressure in the system at 0.8 MPa. Finally, the polymerization was terminated when the amount of the added gaseous monomer mixture reached 7 kg. The pressure was reduced to atmospheric pressure, and the resulting TFE/VDF copolymer was rinsed with water and dried. In this way, 6.7 kg of powder was obtained.

Next, the powder was melt-kneaded into pellets using a single-screw extruder (screw diameter: 20 mm) at a cylinder temperature of 300° C. The obtained pellets were heated to 150° C. for 12 hours.

The composition and physical properties of the obtained pellets were as follows.
TFE/VDF: 60.1/39.9 (mol %)
Melting point: 222° C.
MFR: 1.0 g/10 min (297° C., 5 kg)
Storage modulus (E') at 170° C.: 182 MPa
Thermal decomposition onset temperature (1% by mass loss temperature): 376° C.

The storage moduli (E') of the fluororesins of Examples 1 to 9 and known fluororesins are shown in Table 1.

TABLE 1

| Fluororesin | Trade name | Manufacturer | Melting point (° C.) | Sample molding temperature (° C.) | Storage modulus (E') at 170° C. (MPa) |
|---|---|---|---|---|---|
| Example 1 | | | 231 | 300 | 268 |
| Example 2 | | | 242 | 310 | 132 |
| Example 3 | | | 226 | 300 | 192 |
| Example 4 | | | 228 | 300 | 87 |
| Example 5 | | | 216 | 300 | 87 |
| Example 6 | | | 227 | 300 | 186 |
| Example 7 | | | 218 | 300 | 153 |
| Example 8 | | | 218 | 300 | 155 |
| Example 9 | | | 221 | 300 | 123 |
| VDF homopolymer | Neoflon VDF VP-832 | Daikin Industries Ltd. | 177 | 240 | 2 |
| VDF copolymer | SOLEF 60512/0000 | SOLVAY SOLEXIS | 173 | 240 | 4 |
| VDF/TFE/HFP copolymer | THVX-815G | DYNEON | 226 | 285 | 7 (160° C.) |
| TFE/Et copolymer | Neoflon ETFE EP-521 | Daikin Industries Ltd. | 265 | 330 | 54 |
| CTFE/Et copolymer | HALAR ECTFE 812 | SOLVAY SOLEXIS | 221 | 300 | 18 |
| CTFE homopolymer | Neoflon CTFE M-300P | Daikin Industries Ltd. | 220 | 300 | 54 |
| TFE/HFP copolymer | Neoflon FEP NP-40 | Daikin Industries Ltd. | 266 | 340 | 37 |
| TFE/PAVE copolymer | Neoflon PFA AP-230 | Daikin Industries Ltd. | 306 | 370 | 54 |
| TFE/PAVE copolymer | HYFLON MFA 1041 | SOLVAY SOLEXIS | 284 | 345 | 42 |

1. High-temperature gas permeability test (measurement of $CO_2$ permeability coefficient at 150° C.)

Test Example 1

The temperature of a press machine was controlled to 300° C., and 5.5 g of the pellets prepared in Example 3 were fed into a stainless die (φ 120 mm). After preheating at 300° C. for 20 minutes, the pellets were pressed at 3 MPa and immediately cooled with water. In this way, a 0.236 mm thick film was obtained.

This film was analyzed to determine the carbon dioxide permeability coefficient at 150° C. using the following device under the following conditions. The measured permeability coefficient is shown in Table 2.

Measuring Device

Differential pressure gas/vapor permeability measuring device (GTR-30XAD2 available from GTR Tech Corp., G2700T•F available from Yanaco Technical Science)

Measurement Condition

The measurement was conducted in accordance with JIS K 7126-1 (a differential pressure method) under the following conditions:

Test differential pressure: 1 atm
Test gas: Dry carbon dioxide
Test temperature: 150° C.±2° C.
Permeation area: $1.52 \times 10^{-3}$ m$^2$
Detector: Gas chromatograph (TCD detector).

Comparative Test Example 1

Pellets of the PVDF copolymer (trade name: SOLEF 60512/0000) available from SOLVAY SOLEXIS were pressed at 250° C. into a 0.238 mm thick film in the same manner as described above. Then, the carbon dioxide permeability coefficient of this film was measured at 150° C. in the same manner.

The measured permeability coefficient is shown in Table 2.

TABLE 2

| | Sample | Sample thickness (mm) | $CO_2$ permeability coefficient (150° C.) (cm$^3$ · cm/cm$^2$ · s · cmHg) |
|---|---|---|---|
| Test Example 1 | Example 3 | 0.236 | $5.00 \times 10^{-9}$ |
| Comparative Test Example 1 | PVDF copolymer | 0.238 | $7.32 \times 10^{-9}$ |

From Table 2, the fluororesin of the present invention was found to have a smaller carbon dioxide permeability coefficient at a high temperature (150° C.) than PVDF which is currently used as a barrier material for pipes for transportation from a deepwater oil field.

Test Example 2

Press molding was performed in the same manner as in Test Example 1 to give a film of the fluororesin prepared in Example 7.

This film was analyzed to determine the carbon dioxide and hydrogen sulfide permeability coefficients using the following device under the following conditions. Table 3 shows the results.

Measuring Device

WaSul-PERM-HL3MCSf (available from Hilase Ltd., Hungary)

Measurement Condition

Test temperature: 100° C.±2° C. and 150° C.±2° C.
Test pressure: 1 atm
Test gas: Dry carbon dioxide and dry hydrogen sulfide
Permeation area: 38.5 cm$^2$,
Detector: Photoacoustic gas detector
Gas flow: 50 sccm (1 atm, cc/minute)

Comparative Test Examples 2 and 3

The PVDF copolymer (SOLEF 60512/0000) and the TFE/PAVE copolymer (Neoflon PFA AP-230) shown in Table 1 were press-molded into films in the same manner as in Test Example 1, except that the press-molding temperatures for the PVDF copolymer and the TFE/PAVE copolymer were 250° C. and 370° C., respectively.

These films were analyzed to determine the carbon dioxide and hydrogen sulfide permeability coefficients in the same manner as in Test Example 2. Table 3 shows the results.

TABLE 3

| | | Test Example 2 Example 7 | | Comparative Test Example 2 PVDF copolymer | | Comparative Test Example 3 TFE/PAVE copolymer | |
|---|---|---|---|---|---|---|---|
| Gas | Measurement temperature (° C.) | Sample thickness (mm) | Permeability coefficient ($cm^3 \cdot cm/cm^2 \cdot s \cdot cmHg$) | Sample thickness (mm) | Permeability coefficient ($cm^3 \cdot cm/cm^2 \cdot s \cdot cmHg$) | Sample thickness (mm) | Permeability coefficient ($cm^3 \cdot cm/cm^2 \cdot s \cdot cmHg$) |
| $CO_2$ | 100 | 0.230 | $0.97 \times 10^{-9}$ | 0.220 | $1.27 \times 10^{-9}$ | 0.220 | $4.04 \times 10^{-9}$ |
| $CO_2$ | 150 | 0.220 | $3.08 \times 10^{-9}$ | 0.240 | $7.23 \times 10^{-9}$ | 0.240 | $10.65 \times 10^{-9}$ |
| $H_2S$ | 100 | 0.240 | $0.75 \times 10^{-9}$ | 0.230 | $1.16 \times 10^{-9}$ | 0.240 | $1.33 \times 10^{-9}$ |
| $H_2S$ | 150 | 0.240 | $1.57 \times 10^{-9}$ | 0.230 | $7.22 \times 10^{-9}$ | 0.230 | $3.87 \times 10^{-9}$ |

The results shown in Table 3 confirm that the copolymer of the present invention had a better ability to shield corrosive gaseous components included in petroleum and gas, such as carbon dioxide and hydrogen sulfide, than the known fluororesins.

2. Measurement of High Temperature Strength

Test Example 3

The temperature of a press machine was controlled to 300° C., and 45 g of the pellets prepared in Example 6 were fed into a stainless die (φ 120 mm). After preheating at 300° C. for 30 minutes, the pellets were pressed at 3 MPa and immediately cooled with water. In this way, a 2=thick sheet was obtained.

A dumbbell specimen was punched out from the obtained sheet and measured for tensile modulus (MPa) and yield stress (MPa) in accordance with ASTM D3159 using an autograph equipped with a high-temperature test device (AG-I series, TCLN-382P available from Shimadzu Corp.) under the following conditions:

Distance between chucks: 22.25 mm
Pulling rate: 100 mm/min
Temperature: 160° C.
Table 4 shows the results.

Comparative Test Example 4

Pellets of the PVDF copolymer (trade name: SOLEF 60512/0000) available from SOLVAY SOLEXIS were molded into a 2 mm thick sheet in the same manner as described above. The tensile modulus (MPa) and yield stress (MPa) were measured in the same manner. Table 4 shows the results.

TABLE 4

| | Sample | Tensile modulus (MPa) | Yield stress (MPa) |
|---|---|---|---|
| Test Example 3 | Example 6 | 92 | 5.3 |
| Comparative Test Example 4 | PVDF copolymer | 43 | 3.0 |

From Table 4, the fluororesin of the present invention was found to have higher strength at a high temperature than PVDF.

3. High Temperature Creep Measurement

Test Example 4

The temperature of a press machine was controlled to 300° C., and 60 g of the pellets prepared in Example 7 were fed into a stainless die (φ 50 mm). After preheating at 300° C. for 30 minutes, the pellets were pressed at 2.5 MPa and immediately cooled with water. In this way, a block with a thickness of about 15 mm was obtained. From this block, four cylinder-shaped specimens (diameter: 11.3 mm, height: 10 mm) were cut out.

These specimens were subjected to a creep test in accordance with ASTM-D621 under the following conditions to determine the total deformation and permanent deformation.

The results shown in Table 5 are the averages of the four tested specimens.

Measurement Condition

Temperature: 160° C.

Number of tested specimens n: 4

Constant load: 6.9 MPa

The total deformation (%) and permanent deformation (%) were calculated by the following formulae:

Total deformation (%)=(B/A)×100 and

Permanent deformation (%)=(C/A)×100.

A=height (mm) of a specimen after the specimen was left for 15 minutes at 160° C. without a load applied B=(height (mm) of the specimen after the specimen was left for 15 minutes at 160° C. without a load applied)–(height (mm) of the specimen after the specimen was left at 160° C. for 24 hours with a load applied)

C=(height (mm) of the specimen after the specimen was left for 15 minutes at 160° C. without a load applied)–(height (mm) of the specimen after the specimen was left at 160° C. for 24 hours with a load applied and then left at 160° C. for another 24 hours without a load applied)

Comparative Test Example 5

Creep test specimens were prepared from PVDF copolymer (trade name: SOLEF 60512/0000) available from SOLVAY SOLEXIS by the same procedure as in Test Example 4, except that the press-molding temperature was 250° C. Then, the creep test was performed in the same manner but at test temperatures of 130° C. and 160° C. Table 5 shows the results.

TABLE 5

| Sample | | | 130° C. | 160° C. |
|---|---|---|---|---|
| Test Example 4 | Example 7 | Total deformantion (%) | — | 11.5 |
| | | Permanent deformation (%) | — | 6.5 |
| Comparative Test Example 5 | PVDF copolymer | Total deformation (%) | 17.8 | 53.5 |
| | | Permanent deformation (%) | 5.5 | 36.0 |

From Table 5, the fluororesin of the present invention was shown to deform to a lesser extent under a load at 160° C. than PVDF. The fluororesin of the present invention is usable even at 160° C., in contrast with PVDF which is believed to be unable to withstand use for transportation of crude oil at 130° C. or higher from deep sea.

4. Bending Crack Test

Test Example 5

The temperature of a press machine was controlled to 300° C. and 45 g of the pellets prepared in Example 7 were fed to a stainless die (φ 120 mm). After preheating at 300° C. for 30 minutes, the pellets were pressed at 3 MPa, and immediately cooled with water. In this way, a 2 mm thick sheet was obtained. From the obtained sheet, five rectangular dumbbell specimens (13.5 mm×38 mm) were punched out, and a notch was made with a blade (19 mm×0.45 mm) at the center of a long side of each dumbbell specimen. Each of the five specimens was attached to a jig for the bending crack test, and the jig was placed in an oven at 150° C. and held therein for 1 hour. Thereafter, the temperature was increased at 1° C./min up to 200° C., and the temperature at which a crack developed from the notch was determined.

Table 6 shows the results.

Comparative Test Examples 6 and 7

The bending crack test was performed using the fluororesin prepared in Comparative Example 1 and the PVDF copolymer (trade name: SOLEF 60512/0000) available from SOLVAY SOLEXIS by the same procedure as in Test Example 5, except that the press-molding temperature for the PVDF copolymer was 250° C., and that the pellets amounts were both 40 g. Table 6 shows the results.

TABLE 6

| Sample | | Temperature at which a crack developed |
|---|---|---|
| Test Example 5 | Example 7 | No crack was observed in all the specimens up to 200° C. |
| Comparative Test Example 6 | Comparative Example 1 | A crack was observed at 150° C. |
| Comparative Test Example 7 | PVDF copolymer | No crack was observed up to 170° C. (measured up to the melting point of 172° C.) |

From Table 6, the fluororesin of the present invention was found to be highly resistant to cracking even at a high temperature of 200° C.

5. Chemical Resistance Test

Test Example 6

The temperature of a press machine was controlled to 300° C. and 45 g of the pellets prepared in Example 7 were fed to a stainless die (φ 120 mm). After preheating at 300° C. for 30 minutes, the pellets were pressed at 3 MPa, and immediately cooled with water. In this way, a 2 mm thick sheet was obtained. From the obtained sheet, dumbbell specimens were punched out.

A chemical (200 cc) shown in Table 7 and five specimens were introduced into a 500-cc autoclave, and the autoclave was placed in an oven controlled to 80° C. There, the dumbbells were soaked in the chemical for 7 days.

The weight change (%) before and after soaking was determined and the strength at break and elongation at break were measured before and after soaking in accordance with ASTM D3159 using an autograph (AG-I series, TCLN-382P available from Shimadzu Corp.) under the following conditions:
Distance between chucks: 22.25 mm
Pulling rate: 100 mm/min
Temperature: 23° C.

From the results, the weight change, and retentions of the strength at break and elongation at break were determined. Table 7 shows the results.

The weight change (%), retention (%) of the strength at break, and retention (%) of the elongation at break were calculated by the following formulae:

Weight change(%)=(weight before soaking/weight after soaking)×100−100

Retention of strength at break(%)=(strength at break before soaking/strength at break after soaking)×100

Retention of elongation at break(%)=(elongation at break before soaking/elongation at break after soaking)×100.

Comparative Test Example 8

The chemical resistance test was performed using the PVDF copolymer (trade name: SOLEF 60512/0000) available from SOLVAY SOLEXIS by the same procedure as in Test Example 6, except that the press-molding temperature for the PVDF copolymer was 250° C., and that the pellet amount was 40 g. Table 7 shows the results.

TABLE 7

| | Test Example 6 Example 7 | | | Comparative Test Example 8 PVDF copolymer | | |
|---|---|---|---|---|---|---|
| Chemicals | Weight change (%) | Retention (%) of strength at break | Retention (%) of elongation at break | Weight change (%) | Retention (%) of strength at break | Retention (%) of elongation at break |
| 60% Nitric acid | +0.12 | 101 | 99 | +2.75 | 78 | 84 |
| 98% Sulfuric acid | 0.00 | 104 | 102 | +0.43 | 73 | 64 |
| 50% Sodium hydroxide | −0.11 | 101 | 99 | +0.17 | 64 | 39 |

From Table 7, the fluororesin of the present invention was found to be more resistant to the acid and alkaline chemicals than PVDF.

6. Pipe Extrusion Molding

Molding Example 1

The pellets prepared in Example 8 were molded into a pipe (outer diameter: 254 mm, inner diameter: 244 mm, thickness: 5 mm) under the conditions shown in Table 8 using a pipe extruder (extruder: FS90 series, screw size: 90 mm, L/D=28, die inner diameter/chip outer diameter=260/247 (mm), product of Ikegai Corp.).

The obtained pipe can be used as a barrier layer for a riser pipe.

TABLE 8

| Molding conditions | | | | | | | | |
|---|---|---|---|---|---|---|---|---|
| | C1 | C2 | C3 | C4 | Adaptor | D1 | D2 | D3 |
| Cylinder temperature (° C.) | 230 | 280 | 290 | 290 | 290 | 295 | 295 | 300 |
| Screw rotation speed | | | | 12 rpm | | | | |
| Sizing die water tank temperature | | | | 25° C. | | | | |
| Line speed | | | | 0.1 m/min | | | | |

INDUSTRIAL APPLICABILITY

The fluororesin of the present invention has excellent mechanical strength and chemical resistance, and very low permeability at high temperature and therefore is suitably used as a resin material for a pipe in a riser pipe.

EXPLANATION OF SYMBOLS

1. Body (carcass)
2. Fluid barrier layer
3. Reinforcement layer
4. Anti-friction layer
5. Reinforcement layer
6. Outer resin

The invention claimed is:

1. A fluororesin comprising
   a copolymer that consists of copolymerized units derived from tetrafluoroethylene, vinylidene fluoride, and an ethylenically unsaturated monomer other than tetrafluoroethylene and vinylidene fluoride,
   wherein the fluororesin has a storage modulus E', as measured at 170° C. by a dynamic viscoelasticity analysis, in the range of 60 to 400 MPa and
   wherein the copolymer consists of 55.0 to 90.0 mol % of copolymerized units derived from tetrafluoroethylene, 5.0 to 44.9 mol % of copolymerized units derived from vinylidene fluoride, and 0.1 to 10.0 mol % of copolymerized units derived from an ethylenically unsaturated monomer other than tetrafluoroethylene and vinylidene fluoride, the ethylenically unsaturated monomer being represented by the formula (1):

$CX^1X^2=CX^3(CF_2)_nX^4$ wherein $X^1$, $X^2$, $X^3$, and $X^4$, which may be the same or different, each represent H, F, or Cl, and n is an integer of 0 to 8.

2. A pipe produced from the fluororesin according to claim 1.

3. A riser pipe comprising a pipe that is produced from the fluororesin according to claim 1.

4. A fluororesin comprising
   a copolymer that consists of copolymerized units derived from tetrafluoroethylene, vinylidene fluoride, and an ethylenically unsaturated monomer other than tetrafluoroethylene and vinylidene fluoride,
   wherein the fluororesin has a storage modulus E', as measured at 170° C. by a dynamic viscoelasticity analysis, in the range of 60 to 400 MPa, and
   wherein the copolymer consists of 55.0 to 90.0 mol % of copolymerized units derived from tetrafluoroethylene, 9.2 to 44.2 mol % of copolymerized units derived from vinylidene fluoride, and 0.1 to 0.8 mol % of copolymerized units derived from an ethylenically unsaturated monomer represented by the formula (2):

$CF_2=CF—ORf^1$ wherein $Rf^1$ represents a $C_{1-3}$ alkyl group or a $C_{1-3}$ fluoro alkyl group.

5. A pipe produced from the fluororesin according to claim 4.

6. A riser pipe comprising a pipe that is produced from the fluororesin according to claim 4.

7. A fluororesin comprising
   a copolymer that comprises copolymerized units derived from tetrafluoroethylene, vinylidene fluoride, and an ethylenically unsaturated monomer other than tetrafluoroethylene and vinylidene fluoride,
   wherein the fluororesin has a storage modulus E', as measured at 170° C. by a dynamic viscoelasticity analysis, in the range of 60 to 400 MPa,
   wherein the copolymer comprises 55.0 to 90.0 mol % of copolymerized units derived from tetrafluoroethylene, 5.0 to 44.8 mol % of copolymerized units derived from vinylidene fluoride, 0.1 to 10.0 mol % of copolymerized units derived from a first ethylenically unsaturated monomer other than tetrafluoroethylene and vinylidene fluoride, and 0.1 to 0.8 mol % of copolymerized units derived from a second ethylenically unsaturated monomer, the first ethylenically unsaturated monomer being represented by the formula (1):

$CX^1X^2=CX^3(CF_2)_nX^4$ wherein $X^1$, $X^2$, $X^3$, and $X^4$, which may be the same or different, each represent H, F, or Cl, and n is an integer of 0 to 8, the second ethylenically unsaturated monomer being represented by the formula (2):

$CF_2=CF—ORf^1$ wherein $Rf^1$ represents a $C_{1-3}$ alkyl group or a $C_{1-3}$ fluoro alkyl group.

8. A pipe produced from the fluororesin according to claim 7.

9. A riser pipe comprising a pipe that is produced from the fluororesin according to claim 7.

* * * * *